July 26, 1949.  E. G. HARBORNE ET AL  2,477,058

TOOLHOLDER

Filed June 24, 1946

ERIC G. HARBORNE
GEORGE H. CRAIG
INVENTORS

BY *Herbert J. Brown*
ATTORNEY

Patented July 26, 1949

2,477,058

UNITED STATES PATENT OFFICE 2,477,058

TOOLHOLDER

Eric G. Harborne and George H. Craig,
Fort Worth, Tex.

Application June 24, 1946, Serial No. 678,988

4 Claims. (Cl. 279—56)

This invention relates to tool holders and has particular reference to a holder having jaws or similar parts for engaging the shank ends of certain tools, such as drills, reamers, and the like.

An object of the invention is to provide a key for securing a tool shank against torsional loads, whereas the jaws or other aligning means require only sufficient loads to maintain the said tool shank in alignment.

Another object of the invention is to provide, in addition to the foregoing objects, a construction and mechanism for holding and securing tools of various sizes.

Another object of the invention is to provide, in a tool holder of the referred to class, a tool holder which will not only secure the tool against rotation within the said holder, but one which is self-centering even though it accommodates tool shanks of various sizes.

Generally, the invention contemplates a tool holder of the self-centering type wherein a floating key having a groove therein is employed to engage either an edge or surface at the shank end of the tool for securing the latter against rotation even though lightly held by other parts of the tool holder, such as jaws.

These and other objects will become apparent from the following description of the accompanying drawings, wherein.

Figure 1:
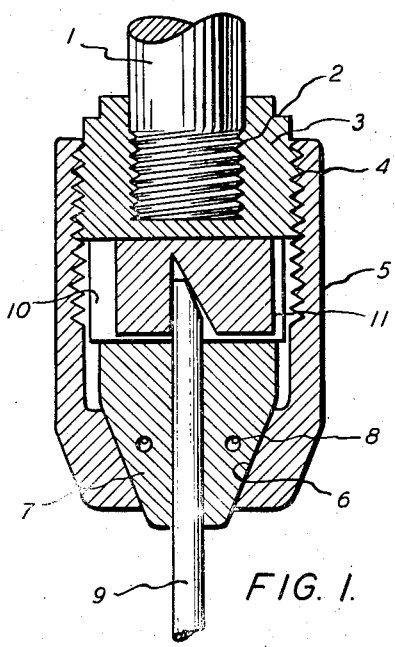
Figure 1 is a vertical sectional view of a tool holder embodying the features of the present invention.
Figure 2:
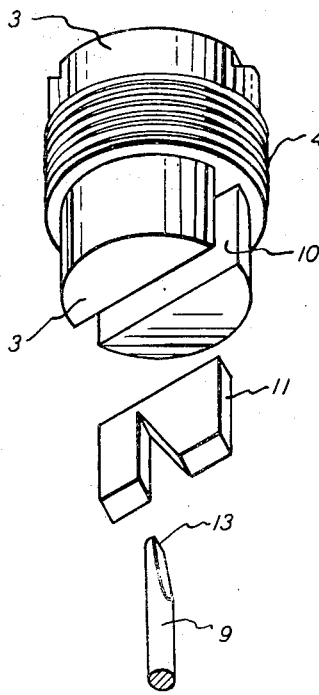
Figure 2 is an exploded perspective view of the holder, the floating key, and the shank end of the tool illustrated in Figure 1.
Figure 3:
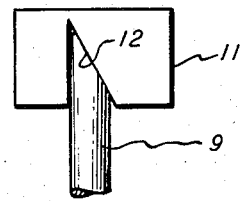
Figure 4:
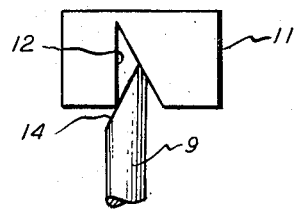
Figure 5:
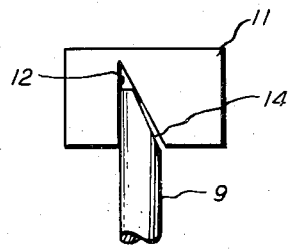

Figures 3, 4, and 5 are elevational views of the key illustrated in Figures 1 and 2, and showing different operating positions therein of beveled tool shanks similar to the one illustrated in Figures 1 and 2.

Figure 6:
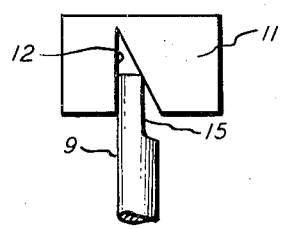

Figure 6 is a view similar to Figure 5 and showing the application of the invention to a tool shank having a flat surface parallel with the longitudinal center of the tool and at the end thereof, and illustrating the engagement of the same with the key.

Although the holder illustrated in Figure 1 is capable of use in various machine tools, the invention will be hereinafter referred to as operating in a vertical position for clearly describing the same.

Accordingly, the holder is either stationarily suspended or rotated by a shaft 1 having threads 2 at the end thereof. A cylindrical key holder 3 is threadedly secured to the shaft 1, and which holder has other threads 4 about its periphery for engaging a thimble or jaw retainer 5. The lower end of the thimble 5 is provided with an opening 6 to receive and support a multiple of tapered jaws 7, the said opening being conical and inwardly inclined toward its lower end so as to support the said jaws. Springs 8 in and between the various jaws 7 normally expand the latter to receive the shank end of a tool 9. Thus, when the thimble 5 is rotated relative to the key holder 3, the jaws 7 are caused to move in or out so as to receive and engage various sizes of tool shanks 9 therebetween.

The lower end of the key holder 3 is provided with a lateral groove 10 to slidably receive a relatively flat and substantially rectangular key 11. One side of the key 11 is provided with a V-shaped recess or notch 12, one side of which is perpendicular to the adjoining side of the key 11.

One side of the shank end of the tool 9 is cut away, as at 13, so as to engage the V 12 of the key 11. The last referred to engagement is applicable to all forms of the invention. Any standard tool 9 may be quickly and easily beveled or similarly shaped by holding the same against a power driven grinder.

Referring now to Figure 3, the shank 9 is inserted into the V 12 so as to cause the bevel 13 to engage the diagonal side of the said V.

As shown in Figure 4, the beveled surface 14 may engage the corner of the key 11 formed by the outer edge of the said key and the perpendicular side of the V 12, in which case the upper end of the said shank rests against the diagonal side of the V. Thus, the operator need not be concerned with the position of the bevel 13 when inserting the tool 9 in the jaws 7 since the tool is keyed against rotation in either of the described positions.

In Figure 5 an engagement between the V 12 and the shank 9 is illustrated wherein the plane of the bevel 13 does not coincide with the diagonal of the said V, but is held in place by reason of the engagement of the corner of the said bevel on the one side of the V, and the engagement between the straight side of the shank 9 with the perpendicular side of the said V.

In Figure 6, one side of the shank 9 is cut away at its end to form a flat surface 14 parallel with the longitudinal center of the said shank. In effect, this arrangement is the same as illustrated in Figure 5.

In operation, the thimble 5 is first rotated relative to the key holder 3, causing the jaws 6 to move apart. The shank of the tool 9 is then inserted between the jaws 7, and the thimble is rotated in the opposite direction causing the jaws to close against the said tool shank. During the last operation the slidable key 11 shifts to accommodate the shaped end of the shank 9 as illustrated in any of the Figures 3, 4, 5 or 6, and by reason of the described engagement, the jaws 7 need not tightly engage the tool shank 9 since the V 12 of the key 11 locks the same against rotation.

It is obvious that the invention is not limited to the form of the construction shown, but may be employed in many ways within the scope of the appended claims.

What we claim is:

1. In a tool holder including means for retaining a tool shank having a cutaway portion at the end thereof, a laterally slidable key within the said holder, and a recess within the said key for receiving the said cutaway portion of the said tool shank.

2. In a tool holder including means for retaining a tool shank having a cutaway portion at the end thereof, a laterally slidable key within the said holder, and a triangular recess within the said key for receiving the said cutaway portion of the said tool shank.

3. In a tool holder including expandable jaws for retaining a tool shank having a cutaway portion at the end thereof, a laterally slidable key within the said holder and a recess within the said key for receiving the said cutaway portion of the said tool shank.

4. In a tool holder including jaws for retaining a tool shank having a cutaway portion at the end thereof, a laterally slidable key within the said holder, and a triangular recess within the said key for receiving the cutaway portion of the said tool shank, said triangular recess being comprised of a side parallel with the longitudinal axis of the said tool shank, and a side which is angularly disposed with respect to the first named side.

ERIC G. HARBORNE.
GEORGE H. CRAIG.

REFERENCES CITED

The following references are of record in the file of this patent:

UNITED STATES PATENTS

| Number | Name | Date |
|---|---|---|
| 339,595 | Stone | Apr. 6, 1886 |
| 832,877 | Richards | Oct. 9, 1906 |
| 1,209,362 | Turner | Dec. 19, 1916 |
| 1,330,111 | Fegley | Feb. 10, 1920 |